United States Patent [19]

Caughey

[11] 4,095,958
[45] Jun. 20, 1978

[54] APPARATUS AND METHOD FOR PRODUCING COMBUSTIBLE GASES FROM BIOMASS MATERIAL

[75] Inventor: Robert A. Caughey, Antrim, N.H.

[73] Assignee: Forest Fuels, Inc., Keene, N.H.

[21] Appl. No.: 808,619

[22] Filed: Jun. 21, 1977

[51] Int. Cl.² .............................................. C10J 3/00
[52] U.S. Cl. ..................................... 48/111; 34/57 C; 48/197 R; 48/209; 201/34; 202/129; 252/373; 110/229; 110/259; 110/342; 110/348
[58] Field of Search ..................... 48/111, 76, 77, 101, 48/203, 209, 210, 197 R, DIG. 4; 110/7 A, 7 R, 102; 201/33, 34; 34/57 A, 57 C; 252/373

[56] References Cited

U.S. PATENT DOCUMENTS

| | | | |
|---|---|---|---|
| 1,813,156 | 7/1931 | Gilchrist | 110/7 R |
| 1,832,092 | 11/1931 | Burnside | 48/203 |
| 2,187,872 | 1/1940 | Winkler et al. | 48/DIG. 4 |
| 4,030,895 | 6/1977 | Caughey | 48/111 |

Primary Examiner—Robert L. Lindsay, Jr.
Assistant Examiner—George C. Yeung
Attorney, Agent, or Firm—Dike, Bronstein, Roberts, Cushman & Pfund

[57] ABSTRACT

A reactor wherein a biomass is moved progressively downwardly along the upwardly facing side of an inclined grate supported with an enclosure comprising a retort, the rear and front walls of which provide, in conjunction with the grate, a plenum chamber at the downwardly facing side of the grate and a mixing chamber at the upwardly facing side of the grate, the said structure providing for converting the biomass by a process of destructive distillation to CO and ash characterized in that the grate is maintained at a temperature below the fusion temperature of the ash to prevent slagging of the ash by the expedient of supplying an excess of primary air to the plenum chamber at the lower end of the grate so that it flows upwardly along the downwardly facing side thereof, the surplus discharged at the top, providing the grate with a plurality of relatively small openings distributed throughout its length and breadth and providing fins at the downwardly facing side of the grate perpendicular to the plane of the underside of the grate which extend into the flowpath of the primary air. The rear wall of the retort is spaced rearwardly from and parallel to the downwardly facing side of the grate and forms therewith a manifold for containing the primary air as it flows upwardly therein, a force draft fan provides for delivering the primary air to the lower end of the manifold chamber and a damper at each end of the manifold chamber provides for controlling the flow of primary air.

17 Claims, 3 Drawing Figures

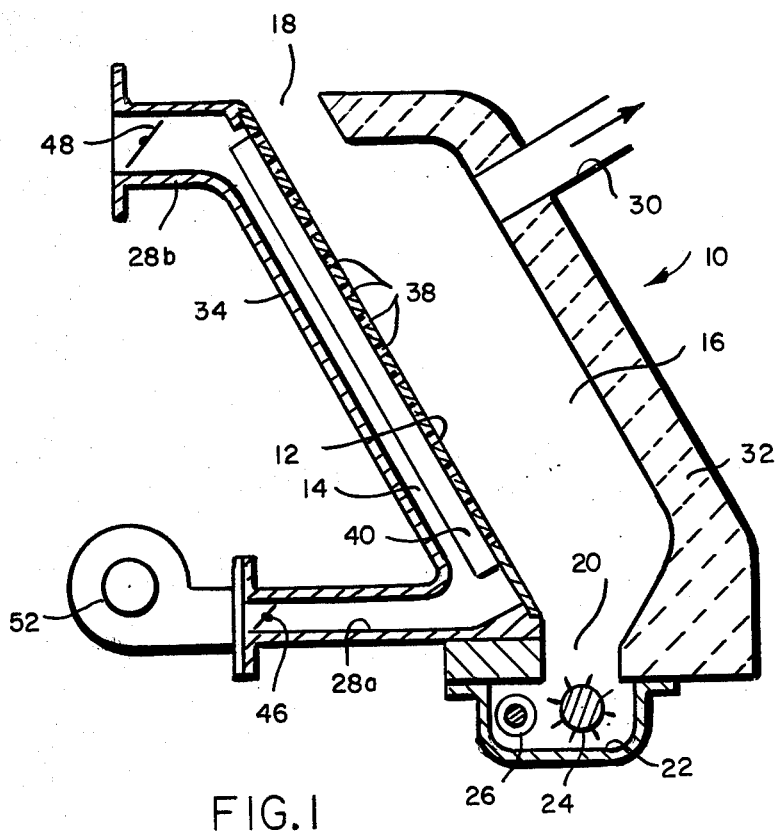
FIG.1
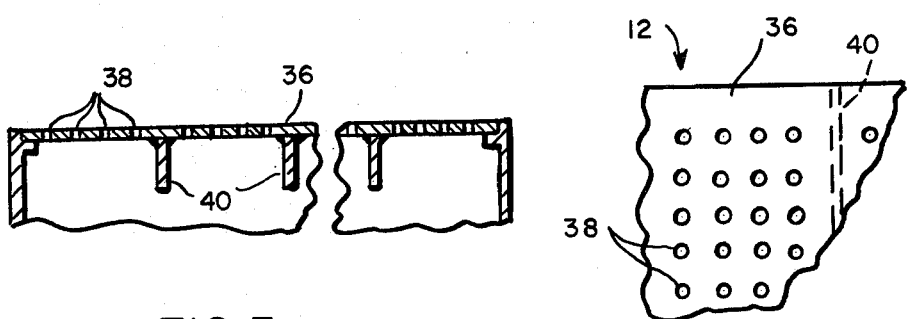
FIG.3
FIG.2

APPARATUS AND METHOD FOR PRODUCING COMBUSTIBLE GASES FROM BIOMASS MATERIAL

BACKGROUND OF INVENTION

In my pending application, Ser. No. 667,673, filed Mar. 17, 1976, now U.S. Pat. 4,030,895, there is disclosed a reactor for converting a biomass into combustible gases and ash so designed as to effect such conversion without generation of airborne ash and/or the deposit of tar and resins on the grate and in the flues. In the apparatus of said application, the grate is in the form of spaced, parallel bars, the spaces being such that the biomass material to be burned can slide downwardly on the upwardly facing inclined surface without falling through the openings between the grate bars. Primary air is supplied to the downwardly facing side of the grate at a controlled rate so as to pass upwardly through the spaces between the grate bars and the bed of biomass resting thereon to promote a progressive combustion of the mass from the lower end upwardly toward the upper end as biomass is supplied to the upper end to produce CO and ash. The CO is mixed in a mixing chamber at the upper side of the grate with the distillates to provide a combustible fuel and the ash is withdrawn from the lower end of the grate. The objective of this invention is to provide for improved operation of the retort shown in the aforesaid application by maintaining the grate which supports the bed of biomass material at a temperature lower than the fusing temperature of the ash so as to avoid the formation of slag and provide better control of the rate of gas production.

SUMMARY OF INVENTION

As herein illustrated, the apparatus for producing combustible gases according to this invention comprises means defining a confining retort having at the top a charging opening, a grate, means supporting the grate in the retort in a downwardly inclined position with its upper end adjacent the charging opening at the top, said grate dividing the retort into a plenum chamber at the downwardly facing side and a mixing chamber at the upwardly facing side, means for feeding a biomass material through the top opening to the upwardly facing side of said downwardly inclined grate in the form of a substantially uniformly thick bed for burning of the biomass material resting on the grate in the zone near the lower end of the grate and destructive distillation of the biomass material resting on the grate and the evolution of a gaseous medium in the zone above the zone of burning, said plenum chamber containing at the downwardly facing side of the grate at the lower end and upper ends openings through which an excess of primary air enters at the lower end of the grate and travels along the upwardly facing side of the grate supplying as it travels upwardly along the downwardly facing side of the grate a sufficient volume of air to convert the burning material to CO and ash. The excess air heated by its contact with the grate is discharged through the top opening and employed as secondary air for mixing with the generated gases in the combustion chamber to which the generated gases are to be supplied. The grate contains relatively small openings uniformly distributed throughout the length and breadth of the grate so as to maintain a uniform temperature over the entire grate area and there are fins at the downwardly facing side of the grate perpendicular to the plane of the downwardly facing side of the grate projecting into the flowpath of the primary air for extracting heat from the grate and the ash on its surface.

The openings in the grate are in the order of 3/32 inches in diameter distributed throughout the length and breadth of the grate and at a spacing on the order of ½ inch and the fins at the downwardly facing side of the grate are spaced apart about 2 inches and correspond substantially in gauge thickness to the gauge thickness of the grate. The plenum chamber is defined by the back wall of the retort and the downwardly facing side of the grate and constitutes a manifold chamber through which the primary air is caused to flow and into which the fins extend into the flowpath of the primary air. A force draft fan pumps air into the lower end of the manifold chamber and there are dampers at the upper and lower ends of the manifold chamber. The damper at the upper end is adapted by closing to increase the firing rate by increasing the static pressure which, in turn, increases the flow of the primary air through the grate and, hence, through the fuel bed. The dampers in conjunction with each other control the static pressure in the manifold chamber in such a way as to enable increasing the air flow for cooling without increasing the flow through the grate and bed.

The invention will now be described in greater detail, with reference to the accompanying drawings, wherein:

FIG. 1 is an elevation in vertical section through the retort;

FIG. 2 is a plan view of a fragmentary portion of the upwardly facing side of the grate; and FIG. 3 is a section taken transversely of the grate.

Referring to the drawings, FIG. 1, the apparatus comprises a retort 10 within which there is supported an inclined grate 12 which divides the retort into a plenum chamber 14 at the downwardly facing side of the grate and a mixing chamber 16 at the upwardly facing side of the grate. The grate 12 is inclined so that the fuel in particulate or fragmentized form delivered through an opening 18 at the top of the retort will gravitate downwardly in the retort in a sufficient quantity so as to maintain a continuous supply for conversion into gaseous products of destructive distillation, CO and ash, within the mixing chamber and so that the residue of ash will gravitate downwardly on the upwardly facing side of the grate through a discharge opening 20 at the bottom into a pit 22 at the bottom of the retort. A rotatable grate bar 24 located in the pit provides for removing the ash from the lower end of the grate and displacing it into the pit and a rotatable screw 26 in the pit provides for removing the ash from the pit. Primary air in excess of that required for gasification of the fuel is delivered through a conduit 28a to the plenum chamber 14 at the lower end of the grate and the excess air not used in effecting destructive distillation and burning of the biomass is removed through a conduit 28b at the top of the retort. The combustible gases generated are delivered from the mixing chamber through a conduit 30 to the combustion chamber of the domestic or commercial installation which is to be supplied with fuel in the form generated as described herein supplemented with secondary air. The walls comprising the front wall 32 amd the rear wall 34 shown herein and the side walls not shown may be comprised of a fire-resistant material such as refractory brick or the like.

In accordance with the improvements of this invention, the grate 12 as shown in FIGS. 2 and 3 comprises a flat plate 36 containing a plurality of holes 38 which are distributed longitudinally and transversely in uniform spacing of approximately ½ inch, the holes being of a diameter in the order of 0.050 to 0.125 inches. At the back of the downwardly facing side of the grate, there are a plurality of transversely distributed, spaced parallel fins 40 which are perpendicular to the plane of the downwardly facing side of the grate. The spacing of the fins is approximately 2 inches. A total hole area of 1 percent to 8 to 10 percent of the grate area is desirable. A 2 percent ratio of hole area to grate area is preferred. The preferred inclination of the grate is at the angle of repose of the biomass which is in the order of 40° to 50° varying in dependence upon the particulate or fragmentized size, surface characteristics, moisture content, cleanliness and the like.

Further in accordance with the invention, the downwardly facing side of the grate, in conjunction with the rear wall of the retort, defines a manifold chamber into which projects the fins 40 and an excess of primary air is forced through this chamber through the spaces between the fins 40 so as to cool the latter and, by cooling the latter, to extract heat from the grate itself, thus to maintain the grate at a temperature lower than the fusing temperature of the ash and, by maintaining the ash at lower than fusing temperature, maintaining it in a powdery form which flows freely downwardly on the upwardly facing side of the grate. A damper 46 is mounted in the inlet conductor 28a and a damper 48 is mounted in an outlet conductor 28b at the top of the retort. An excess of air is delivered to the plenum chamber at the lower end of the grate by means of a fan 52 and it is possible, by having dampers at both ends of the plenum chamber, to control both the static pressure in the chamber and the total volume of air flowing through the chamber. By closing the upper damper, the firing rate may be increased which will, in turn, increase the flow of primary air to the grate. If both dampers are opened wide, it is possible to maintain a constant static pressure in the chamber while increasing the flow of cooling air, thus reducing the grate temperature. The heat absorbed in the cooling process which is discharged through the conduit 28b is not lost since it may be directed to the secondary inlet of a combustion chamber, that is, the mixing chamber in which the gas produced by the generator will be consumed. By thus elevating the secondary air temperature, the final combustion process may be improved.

The particular grate described is designed to reduce problems encountered with accumulation of ash and to afford better control of firing rate.

In order to maintain the firing capacity in any wood-burning device, it is necessary to maintain uniformly controlled fuel/air ratio at any given firing rate. This is the case with any fuel, but, with wood or coal where ash can accumulate, such ash accumulation may restrict the flow of the primary air through the grate, if the ash is allowed to build up on the grate, particularly if the temperatures are allowed to rise beyond the fusion temperature of the ash.

It has been found that by controlling the rate at which the combustion takes place, and by maintaining the grate at well below the fusion point of the ash, it becomes possible to maintain conditions such that the ash will continually slide over the grate and will not accumulate at any other point than in the ash pit.

This is achieved, as was described above, by introducing the primary air through the grate in very small streams so as to prevent raising the temperature in the fuel bed high enough to cause slagging of the ash. As herein illustrated, the openings through which the streams are introduced to the bed are in the order of 0.050 to 0.125 inches in diameter and spaced no closer than ½ inch. As related above, a 2 percent ratio of hole area to grate area is best. Further, as herein described, in order to maintain a relatively cool grate, fins have been attached to the downwardly facing side of the grate so as to draw a considerable amount of the heat from the surface of the grate by using an excess of primary air. For example, if the grate is made of 11 gauge stainless steel, the fins are also made of 11 gauge stainless steel.

In operation, an excess of air is introduced behind the grate by the primary air fan 52, flows upwardly along the downwardly facing side of the grate, being contained by the back wall 34 behind the grate which forms a manifold chamber through which the primary air must flow between the cooling fins 40. By having the dampers at both ends of the manifold chamber, it is possible to control both the static pressure in the manifold chamber and the total volume flowing through the chamber. It is within the scope of the invention to introduce the primary air at the upper end of the grate by means of an induction fan at the lower end so that the air flows downwardly along the downwardly facing side of the grate rather than upwardly as above described.

It should be understood that the present disclosure is for the purpose of illustration only and includes all modifications or improvements which fall within the scope of the appended claims.

I claim:

1. A reactor for producing combustible gases suitable for delivery to the firebox of a furnace comprising means defining a confining retort, said means containing at the top a charging opening, a grate, means supporting the grate in the retort in a downwardly inclined position with its upper end adjacent the charging opening at the top, said grate dividing the retort into a plenum chamber at the downwardly facing side and a mixing chamber at the upwardly facing side, means for feeding a biomass material through the top opening to the upwardly facing side of said downwardly inclined grate in the form of a substantially uniformly thick bed for burning of the biomass material resting on the grate in the zone near the lower end of the grate and destructive distillation of the biomass material resting on the grate and the evolution of a gaseous medium in the zone above the zone of burning, said grate containing a plurality of relatively small openings through which primary air is supplied to the bed resting on the upwardly facing side of the grate in a sufficient quantity to sustain combustion and convert the burning mass to CO and ash, a pit at the bottom of the grate for receiving the ash means for supplying an excess of primary air to the downwardly facing side of the grate at the lower end, and a plurality of transversely spaced, longitudinally extending fins at the downwardly facing side of the grate so that the air flows along the downwardly facing side of the grate at a rate to maintain the grate and ash resting thereon at below the fusing temperature of the ash so that it remains particulate and, hence, loose and free to slide continuously downwardly on the upwardly facing side of the grate into said pit.

2. A reactor according to claim 1 wherein there is means for maintaining the grate at below fusion temperature of the ash comprises a plurality of openings in the grate in the order of 0.050 to 0.125 inches in diameter distributed throughout the length and breadth of the grate at a spacing in the order of ½ inch.

3. A reactor according to claim 1 wherein the plurality of transversely spaced, longitudinally extending fins at the downwardly facing side of the grate corresponding substantially in gauge thickness to the gauge thickness of the grate located in said stream of primary air.

4. A reactor according to claim 1 wherein there is means for maintaining the grate at below fusion temperature of the ash comprises in combination a plurality of openings in the grate of 0.050 to 0.125 inches diameter distributed throughout the length and breadth of the grate at a spacing in the order of ½ inch and the plurality of transversely spaced, parallel, longitudinally extending fins at the downwardly facing side of the grate substantially perpendicular to the plane of the downwardly facing side of the grate, said fins corresponding substantially in gauge to the gauge of the grate and projecting into the stream of primary air.

5. A reactor according to claim 4 wherein the back wall of the retort is spaced from and parallel to the downwardly facing side of the grate and defines with the downwardly facing side of the grate a manifold chamber through which the primary air is caused to flow, and into which the fins extend into the flowpath of the primary air and dampers at the upper and lower ends of the manifold chamber.

6. A reactor according to claim 1 wherein the back wall of the retort is spaced rearwardly from the grate and forms therewith a chamber at the downwardly facing side of the grate extending both longitudinally and transversely thereof, the upper side of which is constituted by the grate, means at the lower end of the chamber for forcing primary air into the chamber behind the grate and means at the ends of the chamber for controlling the static pressure in the chamber and the total volume of air flowing through the chamber.

7. A reactor according to claim 6 wherein said means at the upper end is a damper which is operable by closing to increase the firing rate which, in turn, increases the flow of primary air through the grate.

8. A reactor according to claim 6 wherein said means at the upper and lower ends of the chamber are dampers which may be controlled to maintain a constant static pressure in the manifold chamber while maintaining the flow of cooling air, thus reducing the grate temperature.

9. A reactor according to claim 1 wherein the grate is inclined at an angle in the order of 40° to 50°.

10. The method of generating combustible gases from a biomass material comprising forming a substantially uniformly thick bed of biomass material on the upwardly facing side of a downwardly inclined grate containing longitudinally and transversely distributed openings of 0.050 to 0.125 inch diameter and ½ inch spacing supported within a confining retort, establishing a zone of combustion within the retort on the upwardly facing side of the grate near the lower end thereof, supplying primary air to the bed through said openings in the grate to heat the descending biomass material to progressively convert the mass as it descends from the top of the grate to said zone of combustion to a gaseous medium and charcoal and, at the zone of combustion, converting the charcoal to CO and ash, conducting the heat away from the grate through fins at the downwardly facing side of the grate immersed in the flowpath of primary air to thus maintain the grid at a temperature lower than the fusion temperature of the ash such that the ash remains unfused and flows freely downwardly on the grate, providing means for receiving the ash from the zone of combustion at the lower end of the grate so that the distilled biomass material above the zone of combustion descends progressively into said zone of combustion and is converted into CO and ash, combining the evolved gases and CO within the mixing chamber at the upwardly facing side of the grate and supplying fresh biomass to the upper end of the grate at a rate such as to restrict the upwardly moving combustion to the lower end of the grate.

11. A method according to claim 9 comprising providing dampers for controlling the flow of primary air and increasing the firing rate by closing the damper at the upper end of the grate or by opening the damper at the lower end of the grate.

12. A method according to claim 10 comprising maintaining a static pressure in the chamber while increasing the flow of cooling air, thus reducing the grate temperature, by opening both the supply and discharge dampers.

13. A reactor according to claim 1 wherein there are means defining inlet and outlet openings in the retort in communication with the plenum chamber, respectively, at the lower and upper ends of the grate and a force draft fan connected to the inlet opening for supplying an excess of primary air to the plenum chamber.

14. A reactor according to claim 13 wherein there is a damper in each of said inlet and outlet openings.

15. A reactor according to claim 1 wherein the grate contains holes distributed throughout its length and breadth characterized in that the hole area is 1 percent to 8 to 10 percent of the total grate area.

16. A reactor according to claim 1 wherein the grate contains holes distributed uniformly throughout its length and breadth characterized in that the hole area is approximately 2 percent of the total grate area.

17. A reactor according to claim 1 wherein the angle of inclination of the grate is arranged to correspond substantially to the angle of repose of the fuel.

* * * * *